United States Patent
Dyne

(10) Patent No.: US 7,778,415 B2
(45) Date of Patent: Aug. 17, 2010

(54) SUBSTITUTION CIPHER TEXT-ENCODING AND UN-ENCODING SOFTWARE AND METHOD

(75) Inventor: James F. Dyne, Farmingdale, NJ (US)

(73) Assignee: Avaya Inc., Basking Ridge, NJ (US)

( * ) Notice: Subject to any disclaimer, the term of this patent is extended or adjusted under 35 U.S.C. 154(b) by 959 days.

(21) Appl. No.: 11/590,838

(22) Filed: Nov. 1, 2006

(65) Prior Publication Data

US 2008/0112559 A1 May 15, 2008

(51) Int. Cl.
- *H04L 9/00* (2006.01)
- *H04K 1/00* (2006.01)
- *H04K 1/04* (2006.01)
- *H04K 1/06* (2006.01)
- *H04L 9/28* (2006.01)

(52) U.S. Cl. ............... 380/44; 380/28; 380/37; 380/255; 380/259; 380/277

(58) Field of Classification Search ......... 380/28, 380/37, 44, 255, 259, 277
See application file for complete search history.

(56) References Cited

U.S. PATENT DOCUMENTS

| 6,094,484 | A * | 7/2000 | Hall et al. ............... 380/28 |
| 6,751,736 | B1 * | 6/2004 | Bowman et al. ........... 713/189 |
| 2006/0059362 | A1 * | 3/2006 | Paden et al. .............. 713/184 |

OTHER PUBLICATIONS

Coding for Data and Computer Communications; David Salomon; ISBN: 978-0-387-21245-6, © 2005.*

* cited by examiner

*Primary Examiner*—Christian LaForgia
*Assistant Examiner*—Jahangir Kabir
(74) *Attorney, Agent, or Firm*—Muncy, Geissler, Olds & Lowe, PLLC

(57) ABSTRACT

A method or computer program for encoding or un-encoding data receives a keyword string and removes characters in the keyword string which are not in a pre-approved character set and duplicate characters to form a validated keyword. The validated keyword is sequenced with un-used characters of the pre-approved character set and formed into a cipher grid. Clear text may be encoded using an algorithm in combination with the cipher grid, and encoded text may be un-encoded to form clear text using a reverse algorithm in combination with the cipher grid.

25 Claims, 8 Drawing Sheets

SUBSTITUTION CIPHER TEXT-ENCODING AND UN-ENCODING SOFTWARE AND METHOD

BACKGROUND OF THE INVENTION

1. Field of the Invention

The present invention relates to the field of substitution encoding and un-encoding of text. More particularly, the present invention relates to software and a method for formulating a key based upon a user input and for encoding clear text using a cipher based upon the formulated key. The present invention also relates to software and a method for discovering a key based upon a user input and for decoding encoded text using a cipher based upon the discovered key.

2. Description of the Related Art

Strategic corporate information is oftentimes a key differentiator in the current competitive marketplace. The value of such key elements of corporate knowledge requires a measure of protection especially when such information is transmitted over publicly accessible media such as the Internet. Commercially available data encoding and un-encoding methodologies are time-consuming and usually require that both transmitting and receiving parties access identical, often substantial, encoding reference material.

Substitution ciphers provide an easy method of encoding text. Substitution cipher systems substitute one character for another; however this system often suffers from an inherent weakness when substituting frequently occurring characters, such as the letters E and S in English text, into similarly recurring encoded characters. This allows for the substitution cipher to be easily deciphered.

There is a need, therefore, for an efficient encoding and un-encoding system that is easily portable, difficult to decipher, and that provides output in real time.

SUMMARY OF THE INVENTION

It is an object of the present invention to address one or more of the drawbacks associated with the background art.

It is a further object of the present invention to provide a system and method for formulating a key based upon a user input.

It is a yet further object of the present invention to provide a system and method for encoding clear text using a cipher based upon a formulated key.

It is a still further object of the present invention to provide a system and method for discovering a key based upon a user input.

It is an even further object of the present invention to provide a system and method for decoding encoded text using a cipher based upon a discovered key.

It is an object of the present invention to provide a substitution algorithm which ensures that frequently occurring characters of a language are substituted or encoded differently. For example, the frequently occurring characters of the English language (e.g. E and S) do not have respective single corresponding encoded characters occurring frequently in the encoded text.

It is an object of the present invention to provide a substitution algorithm which is extremely efficient and ensures that clear and encoded substitutions are calculated in real time, and an algorithm which is highly portable and does not require sophisticated computing capability.

It is an object of the present invention to provide an algorithm which can be implemented using readily available programs, such as Microsoft Excel.

These and other objects are accomplished by a method or computer program for encoding or un-encoding data which receives a keyword string and removes characters in the keyword string which are not in a pre-approved character set and duplicate characters to form a validated keyword. The validated keyword is sequenced with un-used characters of the pre-approved character set and formed into a cipher grid. Clear text may be encoded using an algorithm in combination with the cipher grid, and encoded text may be un-encoded to form clear text using a reverse algorithm in combination with the cipher grid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF A PREFERRED EMBODIMENT

Substitution cipher systems rely on a ciphered arrangement of characters to both encode and un-encode text. The apparent randomness of encoded text and the complexity involved in breaking encoded text without knowledge of the keyword or cipher, are in direct relationship to the uniqueness or strength of the cipher. In this invention, the user (unless otherwise noted, "user" refers to either the person who encodes clear text and transmits encoded text, or the person who receives encoded text and un-encodes into clear readable text) enters into the computer program a keyword that determines the order of the resulting cipher.

Figure 1:
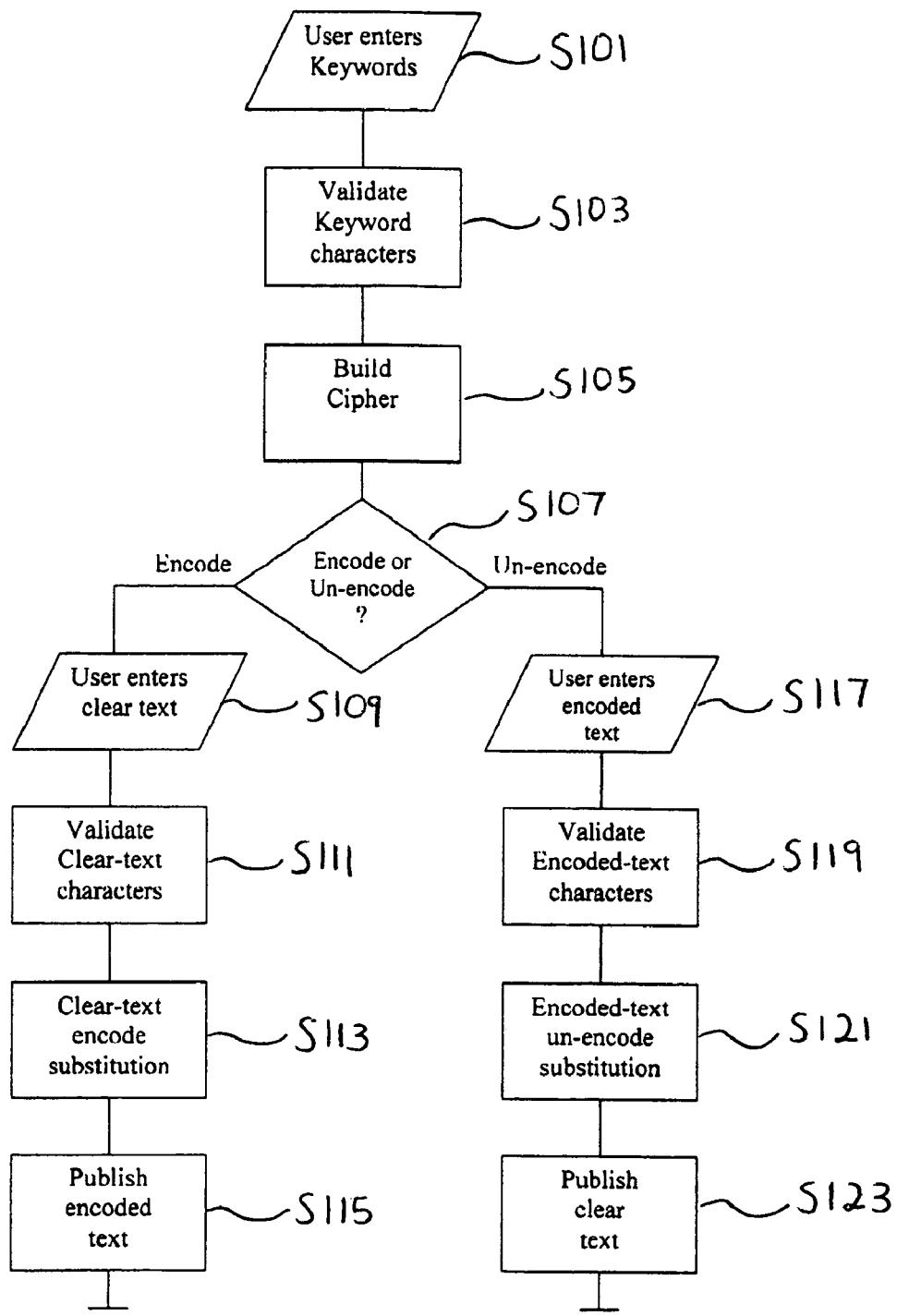
FIG. 1 is a flowchart illustrating a high-level functional flow of a substitution cipher process, in accordance with the present invention.

FIG. 1 is a flow chart illustrating a general operation of an algorithm in accordance with one embodiment of the present invention. More specific information regarding the steps of FIG. 1 will be described in the later Figures.

In step S101 of FIG. 1, a user enters a keyword. In step S103, the characters of the keyword are validated. Validation may include removal of certain characters and/or replacement of certain characters, as will be more fully explained hereinafter in connection with FIG. 2. In step S105, a cipher is built. The cipher is a function of the validated keyword and is the framework by which encoding and decoding of text is accomplished. The building of the cipher will be described in relation to FIG. 3, below.

In step S107, the user selects whether to encode or to un-encode (e.g. decode) a portion of text. If the user selects to encode text, the process proceeds to step S109.

In step S109, the user enters clear text. Clear text refers to text which is readable to the user, i.e., un-encoded text. The user may enter the clear text by typing it directly into an encoding/un-encoding program, but more preferably copies and pastes clear text from a word processing program into a clear text window of the encoding/un-encoding program.

Next, in step S111, the characters of the clear text are validated. Validation can include the removal or replacement of certain characters, such as the removal of multiple spaces and the removal of special unrecognized characters (e.g. Latin or Greek characters, such as β, Ω or α).

Next, in step S113, the validated clear text is encoded using the cipher built in step S105. Step S115 follows step S113. In Step S115, encoded text is published which may include such actions as displaying, storing, printing or transmitting the encoded text (such as transmitting the encoded text by email over the Internet).

If in step S107 the user selects to un-encode text, the process proceeds to step S117. In step S117, the user enters encoded text. Encoded text refers to text which is unreadable to the user. The user may enter the encoded text by typing it directly into an encoding/un-encoding program, but more preferably copies and pastes encoded text from an email or word processing program into an encoded text window of the encoding/un-encoding program.

Next, in step S119, the characters of the encoded text are validated. Validation can include the removal or replacement of certain characters, such as the removal of spaces, padding characters and the replacement or removal of special characters.

Next, in step S121, the validated encoded text is un-encoded using the cipher built in step S105. Step S123 follows step S121. In Step S123, un-encoded text (i.e. the clear text) is published, which may include such actions as displaying, storing, printing or transmitting the un-encoded text.

A. Keywords

Keywords may be represented by a single word. Alternatively, keywords may be a phrase containing multiple words, numbers and special characters. Alternatively, keywords may be a made-up code formed by a combination of alphabetic characters, and numerals, and/or special characters. In a first embodiment of the present invention, the special characters used in the keyword are limited to six possibilities: a space, period, comma, question mark, and left and right parenthesis.

There is no practical limit to which characters may be used in Keywords. Therefore in other embodiments of the present invention, the special characters could be limited to six other special characters (e.g. a space, pound sign, percentage sign, dollar sign, comma, and period). Also, it is envisioned than the special character set to could include more special characters, such as twelve or thirteen special characters, as will be discussed later in the description. However, in the first embodiment of the present invention limiting acceptable special characters to the six listed, ensures that the substitution cipher methodology can be easily used on any English-language keyboard (e.g. the keyboard actually includes the six special characters). Of course it would be possible to use special characters other than those actually present on the keyboard, if the software permitted the insertion of special characters into the text, as does Microsoft WORD's "insert symbol" command. The important aspect is that both the transmitting (encoding) and receiving (un-encoding) parties must use identical Keywords when using the substitution cipher program.

It is preferred that the initial user's input of the Keyword string in step S101 be limited to a maximum number of characters, for example 70 characters or 90 characters. Since only 42 characters are required to fully determine the final cipher, the balance of the keyword characters (e.g. 28 characters or 48 characters) ensures that sufficient characters are used in the cipher if the Keyword contains multiple spacing between individual words.

The Keyword validation step S103 of the present invention deletes multiple spacing within the Keyword input string and validates that only alphabetic characters, numerals, or approved special characters have been entered. The substitution cipher requires that only one instance of each acceptable alphabetic character, numeral or special character occurs in the cipher. The Keyword validation step S103 therefore also deletes any instances of multiple characters within the Keyword.

Table 1 shows a sample Keyword input string and the resulting validated Keyword. In Table 1 and in the actual validated keyword and cipher, the symbol ^ has been used to indicate a space.

TABLE 1

| Un-validated Keyword input | Route 287 to Basking Ridge, meet in room 3A138. |
|---|---|
| 42-character truncated Keyword | Route 287 to Basking Ridge, meet in room 3 |
| Validated Keyword | ROUTE^287BASKINGD,^M3 |

Referring to Table 1, the first instance of a space has been replaced by the character ^, all duplicate characters, including subsequent duplicate spaces, have been deleted, resulting in a validated Keyword that contains only unique instances of each of the characters of the initial keyword string.

Figure 2:
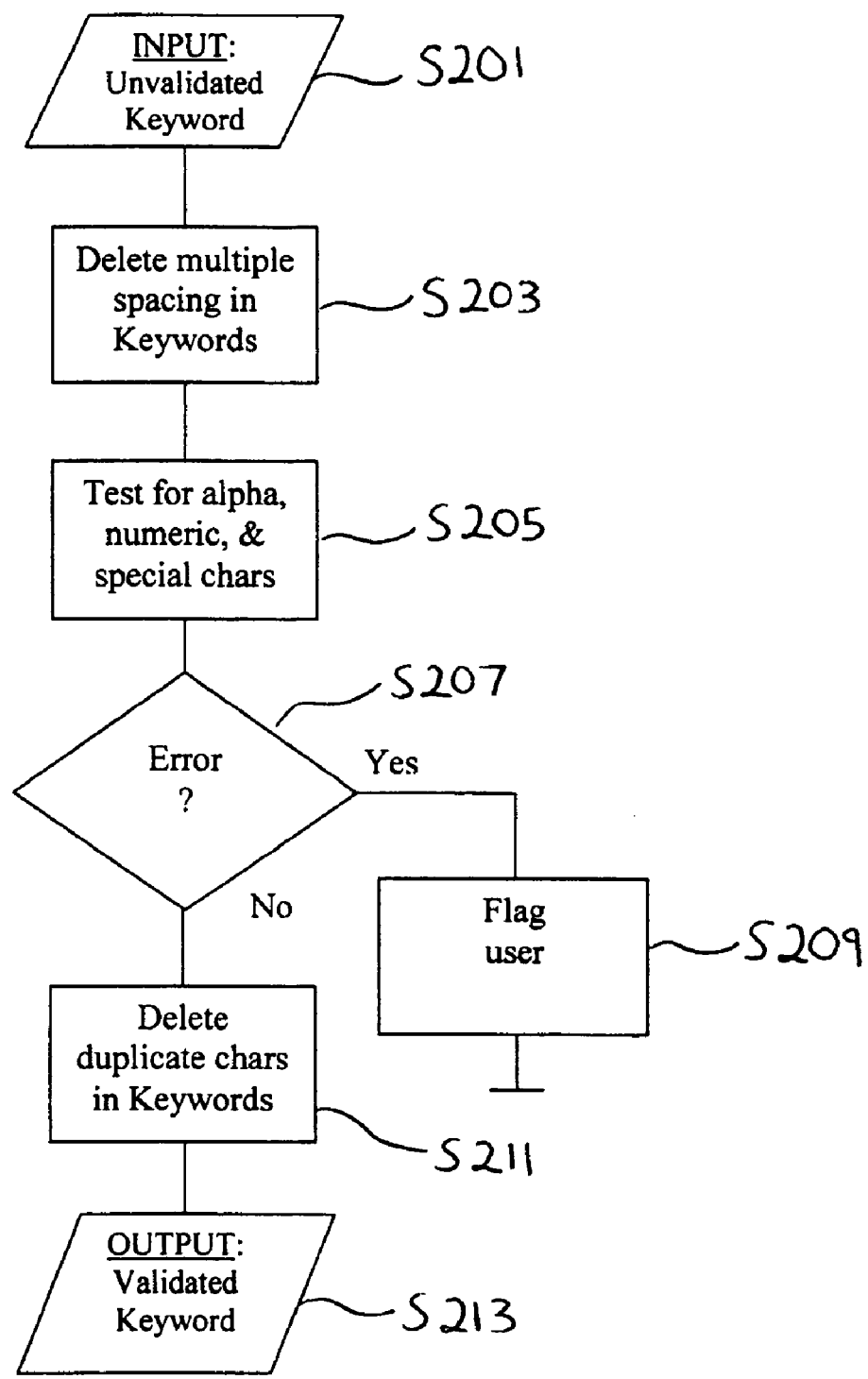
FIG. 2 is a flowchart illustrating how characters in a Keyword are validated.

FIG. 2 is a flow chart illustrating the process that results in a validated Keyword. In step S201, the user inputs an un-validated keyword, such as "Route 287 to Basking Ridge, meet in room 3A138." The input can be made by the user clicking in a keyword entry box of the encoding/un-encoding program and directly typing the un-validated keyword on a keyboard, or by the user cutting and pasting a keyword into the keyword box of the encoding/un-encoding program.

Next, in step S203, the program deletes any multiple spaces (such as the multiple spaces between "Route" and "287") and truncates the modified keyword to 42 characters. The truncated keyword would be "Route 287 to Basking Ridge, meet in room 3".

Next in step S205, the program evaluates the truncated keyword for unrecognized special characters. In the first embodiment described herein, only alphabetic characters, numerals, and six special characters are approved for the keyword. The six approved special characters are a space, period, comma, question mark, and left and right parenthesis. If a non-approved special character is present (e.g. a register trademark symbol ®, the dollar sign $, a smiley face ☺),an error is found in step S207 and the user is alerted as to the presence and reason for the error in step S209 and asked to input a different keyword.

If all of the characters in the truncated keyword are approved in step S207, the process proceeds to step S211. In step S211, duplicate characters in the keyword are deleted. In the first embodiment of the present invention, the first occurrence of each duplicate character is retained and the second and subsequent occurrences of the duplicated character are deleted. Hence, the validated keyword would be "ROUTE^287BASKINGD,M3", which would be outputted in step S213.

B. Cipher

The Cipher of the present invention is based on a combination of the validated Keyword and all remaining characters in the acceptable character set (alphabetic characters, numerals, and special characters). Forty-two characters are required in the cipher to represent the complete character set in accordance with the first embodiment of the present invention.

Table 2 shows the validated Keyword from the example in Table 1, together with the remaining characters in the complete character set.

TABLE 2

| | |
|---|---|
| Validated Keyword | ROUTE^287BASKINGD, M3 |
| Complete Character Set | ABCDEFGHIJKLMNOPQRSTUVWXYZ0123456789^.,?( ) |
| Characters not used in Keyword | CFHJLPQVWXYZ014569.?( ) |
| Cipher | ROUTE^287BASKINGD, M3CFHJLPQVWXYZ014569.?( ) |

Referring to Table 2, the characters not used in the validated keyword are padded to the validated keyword resulting in a cipher that contains only unique instances of every character in the complete character set. In other words, the cipher is composed of the validated keyword "ROUTE^287BASKINGD,M3" immediately followed by the characters in the complete character set which were not used in the validated keyword "CFHJLPQVWXYZ014569.?( )" and totals forty two characters.

Figure 3:
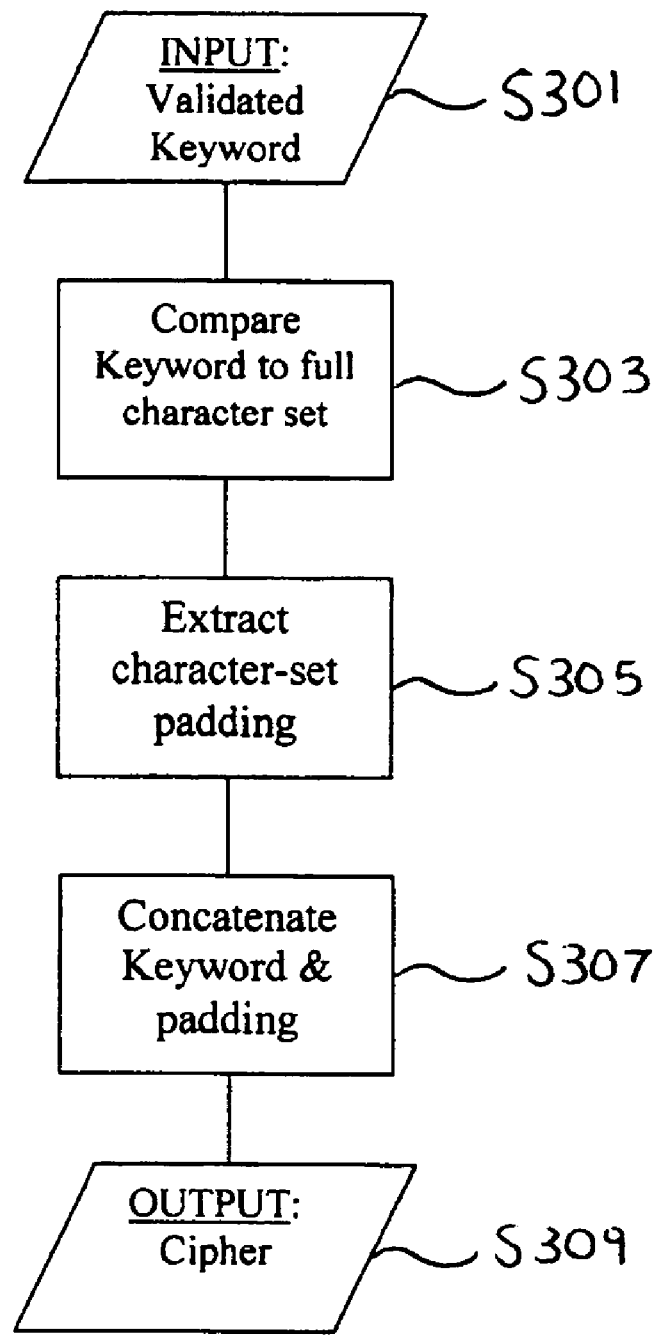
FIG. 3 is a flowchart illustrating how the validated Keyword and character-set padding are combined into a unique Cipher.

FIG. 3 is a flow chart illustrating the process for forming the cipher. In step S301, the validated keyword of FIG. 2 is received by the program. Next, in step S303, the validated keyword is compared to the complete character set of alphabetic, numerical and special characters, i.e. "ABCDEFGHIJKLMNOPQRSTUVWXYZ0123456789^. ?( )", in the first embodiment of the present invention.

Next, in step S305, the process extracts the character padding set. The character padding set consists of the characters remaining in the complete character set, after the validated keyword characters are removed there from.

In step S307, the cipher S309 is outputted. In the example of Table 2, the cipher would be:

ROUTE^287BASKINGD, M3CFHJLPQVWXYZ014569.?( )

C. Encoding/Substitution Algorithm

In accordance with a first embodiment of the present invention, the cipher is formatted into a 7-column by 6-row grid. Table 3-1 shows the cipher from the example in Table 2 formatted into the 7-column by 6-row cipher grid. Table 3-2 shows the grid positions within the cipher grid.

TABLE 3-1

| R | O | U | T | E | ^ | 2 |
|---|---|---|---|---|---|---|
| 8 | 7 | B | A | S | K | I |
| N | G | D | , | M | 3 | C |
| F | H | J | L | P | Q | V |
| W | X | Y | Z | 0 | 1 | 4 |
| 5 | 6 | 9 | . | ? | ( | ) |

TABLE 3-2

| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |

Referring to Table 3-1, the characters in the Cipher are formatted sequentially in each successive grid position, starting at the upper left hand corner (i.e., position 1 in Table 3-2) and ending in the lower right hand corner (i.e., position 42 in Table 3-2).

The first step to encoding clear text by a substitution algorithm in accordance with the present invention is to enter the clear English-language text into the computer system/program. Clear text may contain a single word or a phrase containing multiple words, and may only contain alphabetic characters, numerals, or special characters in the complete character set of Table 2. The clear text may be entered into the encoding program by clicking in a clear text entry box and typing the clear text using a keyboard. However, more preferably the clear text is copied from a word processing program or email and pasted into the clear text entry box of the encoding program.

Table 4 shows sample clear text, cipher grid positions, and encoded output.

TABLE 4

| | |
|---|---|
| Sample Clear Text | Sell one million shares at USD 15.76 |
| Multiple Spaces Deleted | Sell one million shares at USD 15.76 |
| Cipher Grid Position | 12, 5, 25, 25, 6, 2, 15, 5, 6, 19, 14, 25, 25, 14, 2, 15, 6, 12, 23, 11, 1, 5, 12, 6, 11, 4, 6, 3, 12, 17, 6, 34, 36, 39, 9, 37 |
| Substituted Cipher Grid Position | 19, 12, 26, 26, 7, 3, 1, 19, 20, 5, 28, 11, 11, 28, 16, 1, 13, 5, 9, 25, 2, 6, 5, 13, 18, 11, 7, 4, 19, 10, 13, 41, 37, 40, 16, 2 |
| Encoded Text Equivalent | MSPP2URM3EVAAVGRKE7LO^EK, A2TMBK(6?GO |

Figure 4:
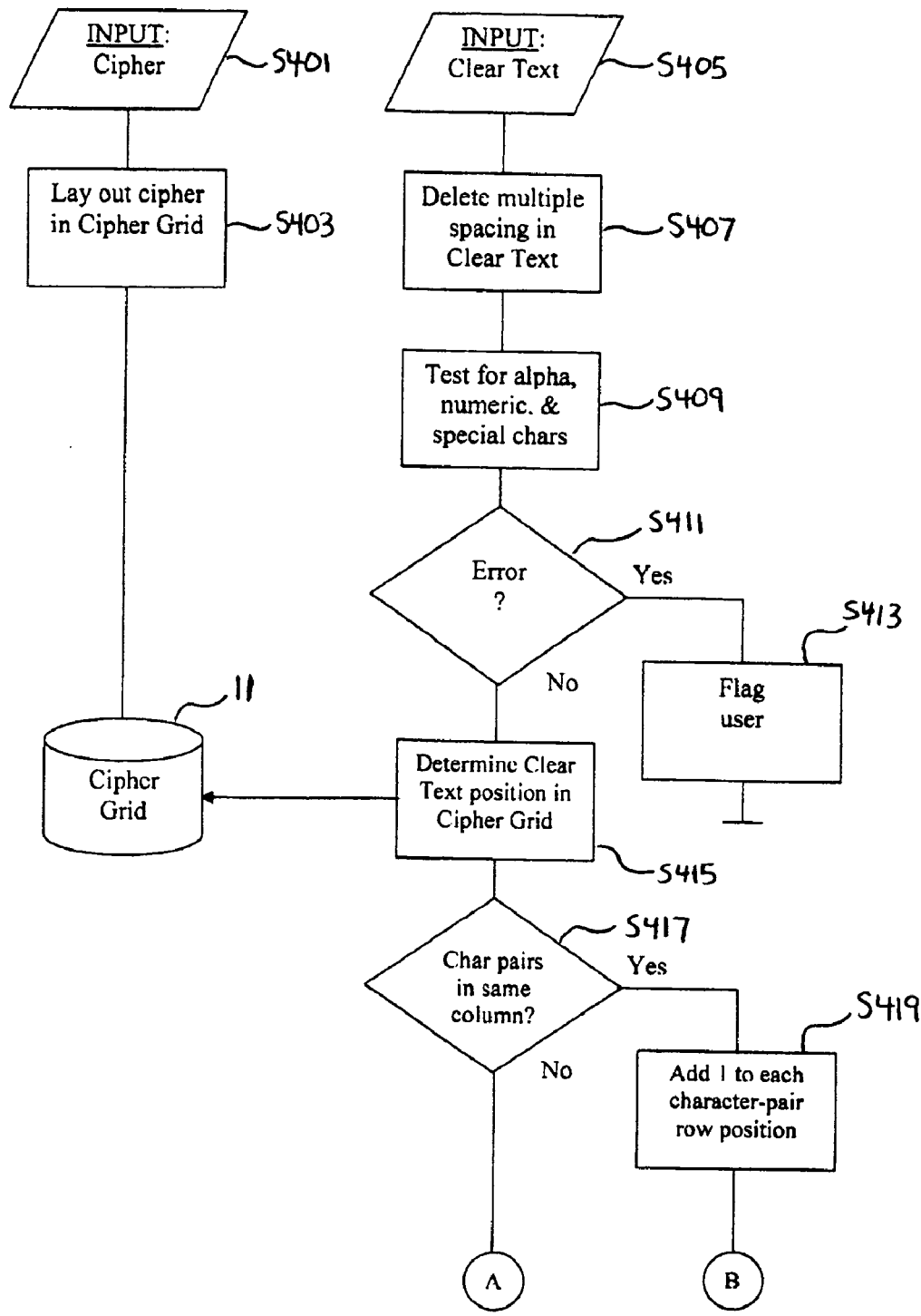
FIG. 4 is a flowchart illustrating the clear-text to encoded-text substitution methodology.
Figure 4:
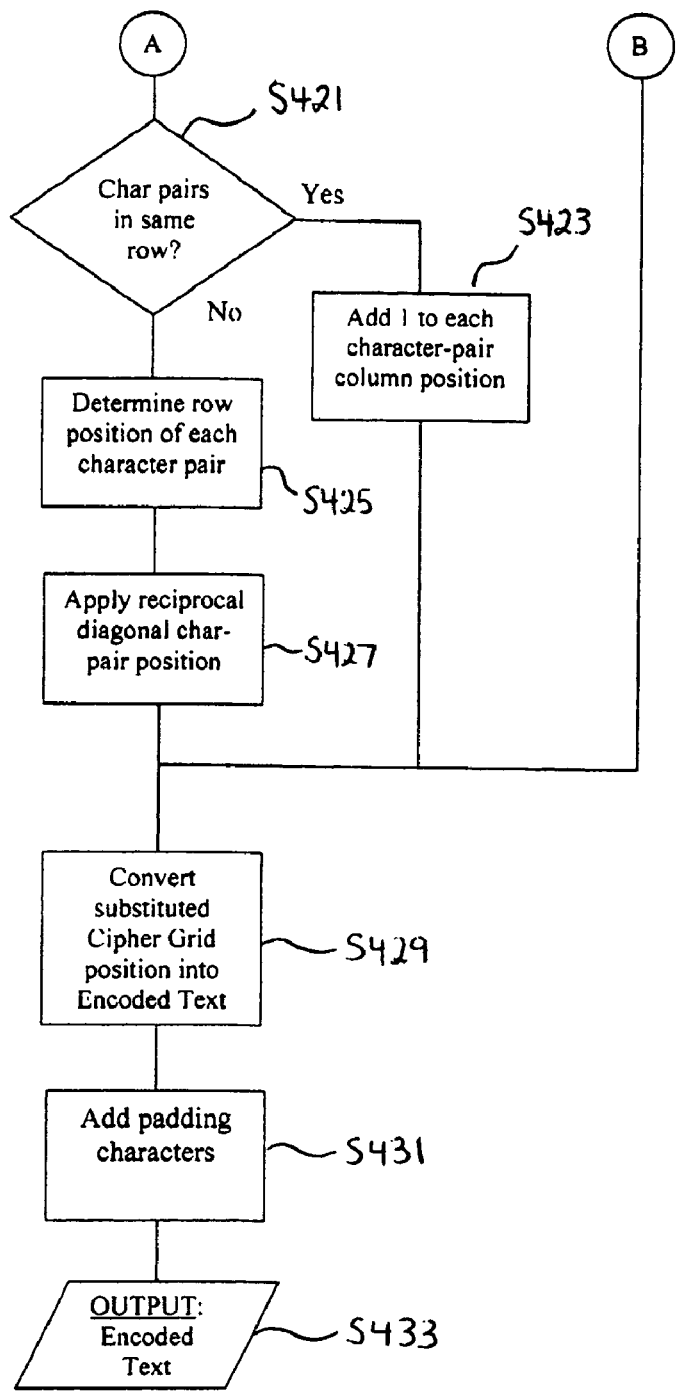

Referring to the flow chart in FIG. 4 and Table 4 above, an encoding algorithm will be described. In step S401, the cipher of step S309 is obtained in the encoding/un-encoding program. In step S403, the cipher is formed into a grid, such as the cipher grid illustrated in Table 3-1. The cipher grid is then stored in a computer readable medium 11 (such as, a hard drive, CD, DVD, or other type of memory device), which device may also store the operational programs for performing the encoding and/or un-encoding algorithms in accordance with the present invention.

In step S405, the user inputs the clear text, such as "Sell one million shares at USD 15.76", from Table 4. In step S407, all multiple spaces between clear-text words are deleted. Next, in step S409, the clear text is validated to ensure that only alphabetical characters, numerals, or special characters (in the complete character set of Table 2) have been entered.

If a character in the clear text is not in the complete character set of Table 2, an error is determined in step S411 and the process proceeds to step S413. In step S413, the user is alerted as to the presence and reason for the error in step S413. As an example, if the error were the presence of the dollar sign $ (not a character in the complete character set of Table 2) in the clear text, the user could deleted the $ sign and replace it with the letters "USD" to correct the error.

If no error is found in step S411, the process proceeds to step S415. In step S415, each clear-text character is compared to the cipher grid to determine its relative position. For example, the letter "S" in the clear-text word "Sell" appears in cipher grid position 12. The letter "e" in the clear-text word "Sell" appears in cipher grid position 5. The letters "l" in the clear-text word "Sell" appear in cipher grid position 25. The space (represented by the character """ in the complete character set) appears in cipher grid position 6. As shown in Table 4, the entire clear text can be represented by the following grid positions: 12, 5, 25, 25, 6, 2, 15, 5, 6, 19, 14, 25, 25, 14, 2, 15, 6, 12, 23, 11, 1, 5, 12, 6, 11, 4, 6, 3, 12, 17, 6, 34, 36, 39, 9, 37.

The characters of each character pair are then evaluated to determine their positions relative to each other within the cipher grid. The characters of the first character pair in the example of Table 4 are located in positions 12 and 5 of the cipher grid, the characters of the second character pair are located in positions 25 and 25 of the cipher grid, etc.

There are three possible relative positions of the characters of a character pair: (1) The characters in the character pair are in the same column in the cipher grid; (2) The characters in the character pair are in the same row in the cipher grid; and (3) The characters are neither in the same column nor in the same row in the cipher grid.

a. Character Pairs in the Same Cipher Grid Column

Step S417 of the encoding/substitution algorithm checks to see if the characters in the clear-text character pair occur in the same column in the cipher grid. Referring to Table 4 and Table 3-1, the characters of the character pair "Se" in the clear-text word "Sell" occur in the same column. In other words, the letter "S" is in position 12 in Table 3-2 and the letter "e" is in position 5 in the Table 3-2. Positions 12 and 5 are in the same column of Table 3-2. The clear-text letters "a" and "t" also occur in the same column, i.e. positions 11 and 4.

For those character pairs that occur in the same cipher grid column, the algorithm proceeds to step S419. In step S419, the algorithm adds one row to the relative cipher grid row. Thus, the cipher grid positions of the character pair "Se" are changed from 12 and 5 to 19 and 12. Also, the cipher grid positions of the character pair "at" are changed from 11 and 4 to 18 and 11.

The characters "l" and "l" in the word "Sell" could be considered as being in the same column and also be considered as being in the same row. One need only establish a consistent rule to deal with such an occurrence, which would apply equally to both encoding and decoding processes. In the first embodiment of the present invention, such repeating characters will not be treated as being in a same column, and will be treated as being in a same row.

If the characters in the character pair are not in the same column of the cipher grid, the process proceeds to step S421.

b. Character Pairs in the Same Cipher Grid Row

Step S421 of the encoding/substitution algorithm checks to see if the characters in the clear-text character pair occur in the same row of the cipher grid. Referring to Table 4 and Table 3-1, the characters in the character pair "re" in the clear-text word "shares" occur in the same row, i.e., the first row. Similarly, the clear-text characters "5" and "." occur in the same row, i.e. the sixth row.

For those character pairs that occur in the same cipher grid row, the process proceeds to step S423. In step S423, the algorithm adds one column to the relative cipher grid column. Thus, the cipher grid positions of the character pair "re" are changed from 1 and 5 to 2 and 6. Likewise, the cipher grid positions of the character pair "5." are changed from 36 and 39 to 37 and 40. Also, since the characters "l" and "l" in the character pair "ll" of the word "sell" are considered to be in the same row in the cipher grid, as discussed above, the cipher grid positions of "ll" are changed from 25 and 25 to 26 and 26.

If the characters in the character pair are not in the same row of the cipher grid, the process proceeds to step S425.

c. Character Pairs Not in the Same Cipher Grid Column or Row

In step S425, the encoding/substitution algorithm determines the relative cipher grid row and column position of each character pair and then in step S427 substitutes the reciprocal diagonal cipher grid positions. Referring to Table 4 and Table 3-1, the characters in the character pair "ne" in the clear-text word "one" do not occur in the same column or row of the cipher grid; their relative cipher grid positions are 15 and 5. Reciprocal diagonal substitution changes these positions to 1 and 19, respectively. As another example, the characters in the character pair "^m" of the clear text phrase "one million" do not occur in the same column or row; their relative cipher grid positions are 6 and 19. Reciprocal diagonal substitution changes these positions to 20 and 5, respectively. As yet another example, the characters in the character pair "il" of the clear text word "million" do not occur in the same column or row; their relative cipher grid positions are 14 and 25. Reciprocal diagonal substitution changes these positions to 28 and 11, respectively.

Each character pair of the clear text will undergo one of column, row, and diagonal substitution in steps S419, S423 or S427. Once the grid position substitution has occurred in one of steps S419, S423 or S427, the substituted grid position location is used to pick a new encoded character to represent the clear text character in step S429. Once all character pairs of the clear text have been processed, the result is a string of encoded text characters. The last line in Table 4 shows the characters resulting from the column, row, and diagonal substitution algorithms discussed above. As Table 4 shows, the output string is remarkably encoded, as compared to the original clear text. The encoded text is completely unrecognizable as follows: "MSPP2URM3EVAAVGRKE7LO^EK, A2TMBK(6?GO".

If desired, padding can be added in step S431. For example, character padding in the form of a plurality of blank spaces can be added as represented by a plurality of 2's (e.g. four such characters) to the end of the encoded text to so indicate the end of the encoded text. Pairs of blank spaces would be viewed as being in the same row (i.e., the first row) and would therefore have one row added to their position (i.e., from position 6 to position 7) and be encoded as 2's (i.e., the text character in position 7 of the cipher grid is a 2). Finally in Step S433, the encoded text may be published, which may include such actions as displaying, storing, printing or transmitting the encoded text.

Using this cipher grid of the present invention, frequently occurring English-language characters are encoded differently depending on their character-pair cipher grid position. For example:

The letter "e" in the clear-text word "Sell" is encoded as the character "S". Yet, the letter "e" in the clear-text word "one" is encoded as the character "M". Yet again, the letter "e" in the clear-text word "shares" is encoded as the character "^". Hence, one can see that the frequently occurring English language text character "e" is not be encoded the same way in each occurrence. This makes the encoding very difficult to break without the keyword.

D. Un-Encode Substitution

Figure 5:
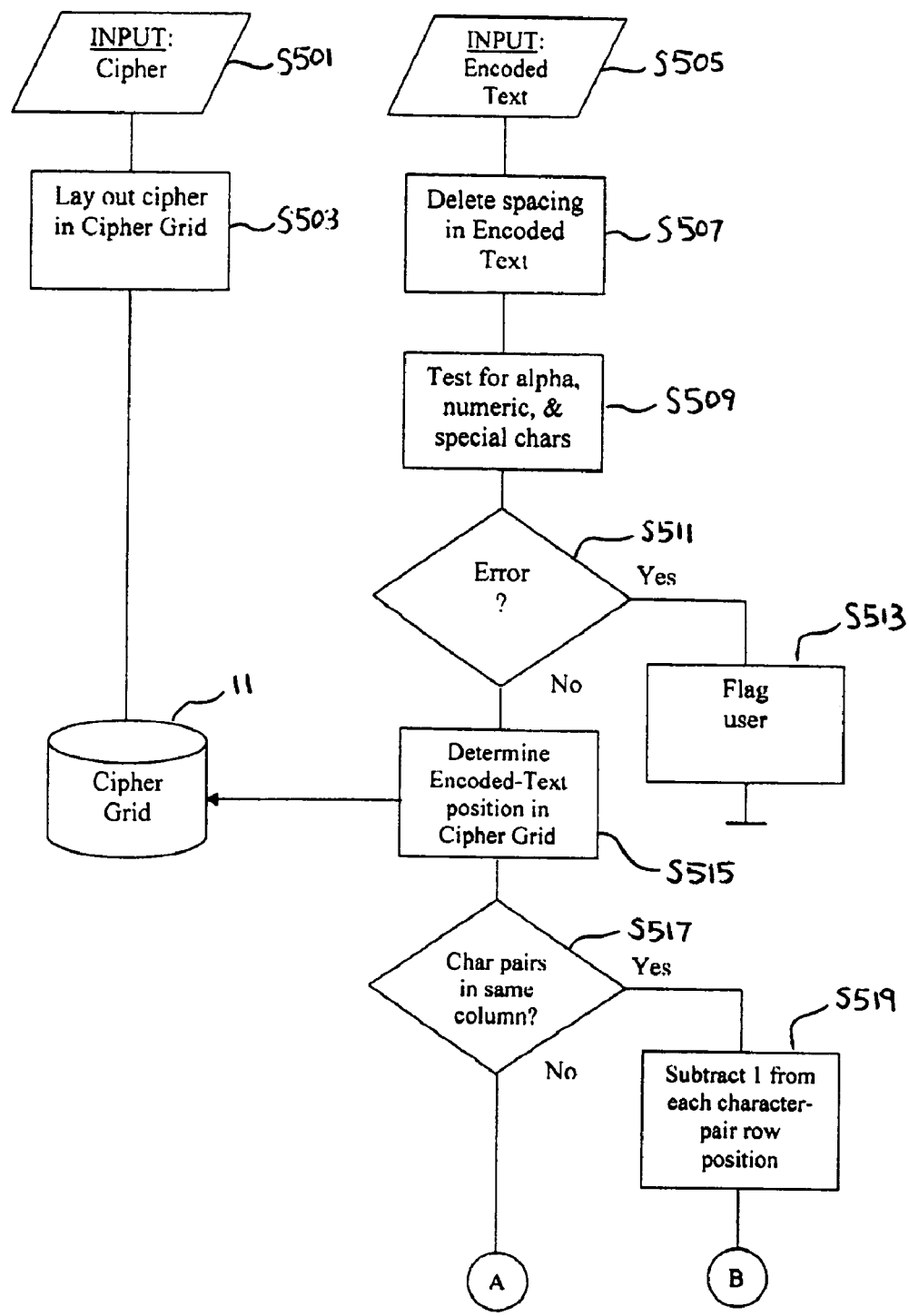
FIG. 5 is a flowchart illustrating the encoded-text to clear-text substitution methodology.
Figure 5:
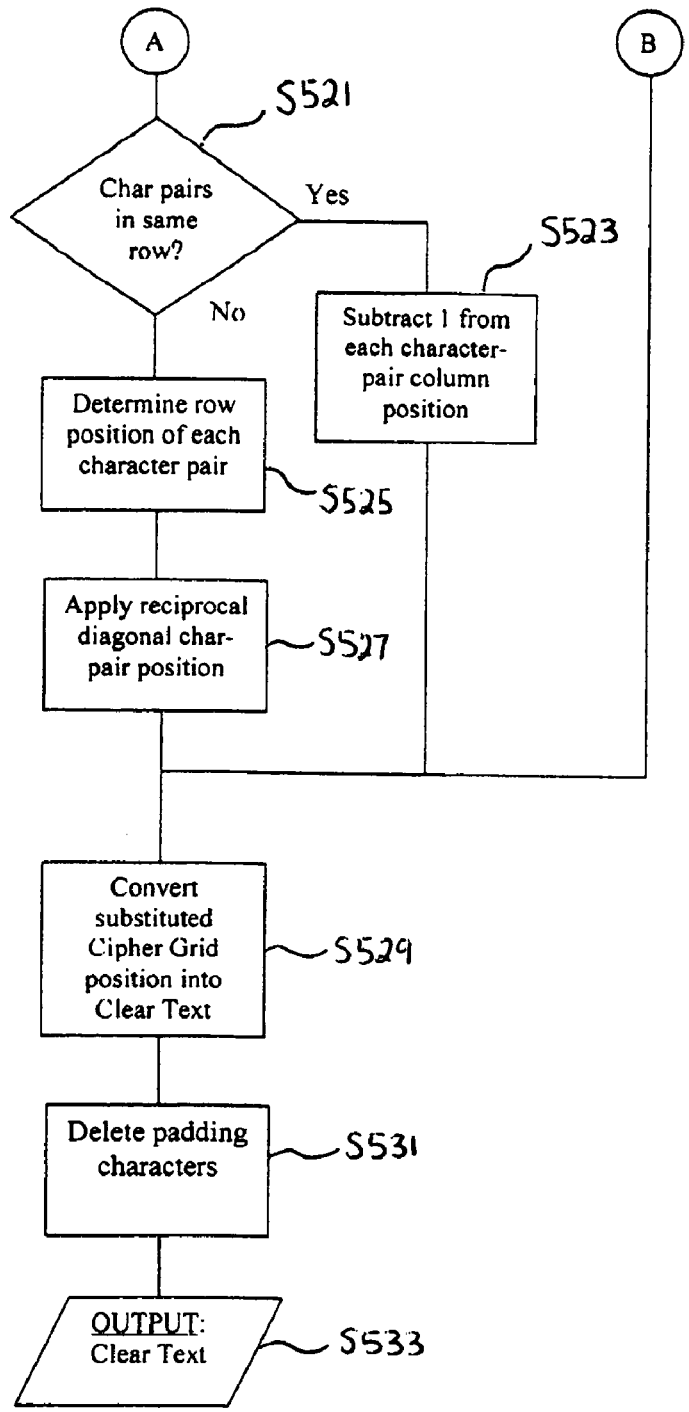

FIG. 5 is a flow chart illustrating the un-encoding substitution algorithm of the present invention. The un-encoding substitution algorithm relies on the same cipher grid (Table 3-1) used in the encoding substitution algorithm.

The first step to un-encoding encoded text by a substitution algorithm in accordance with the present invention is to enter the encoded text into the computer system/program. Encoded text may only contain alphabetic characters, numerals, or special characters in the complete character set of Table 2. The encoded text may be entered into the un-encoding program by clicking in an encoded text entry box and typing the encoded text using a keyboard. However, more preferably the encoded text is copied from a word processing program or email and pasted into the encoded text entry box of the un-encoding program.

Table 5 shows sample encoded text, cipher grid positions, and clear text output.

TABLE 5

| | |
|---|---|
| Sample Encoded Text | MSPP2 URM3E VAAVG RKE7L O^EK# A2TMB K%6?G O2222 |
| Cipher Grid Position | 19, 12, 26, 26, 7, 3, 1, 19, 20, 5, 28, 11, 11, 28, 16, 1, 13, 5, 9, 25, 2, 6, 5, 13, 18, 11, 7, 4, 19, 10, 13, 41, 37, 40, 16, 2, 7, 7, 7, 7 |
| Substituted Cipher Grid Position | 12, 5, 25, 25, 6, 2, 15, 5, 6, 19, 14, 25, 25, 14, 2, 15, 6, 12, 23, 11, 1, 5, 12, 6, 11, 4, 6, 3, 12, 17, 6, 34, 36, 39, 9, 37, 6, 6, 6, 6 |
| Clear Text Equivalent | SELL^ONE^MILLION^SHARES^AT^USD^15.76^^^^ |

Referring to the flow chart in FIG. 5 and Table 5, an un-encoding algorithm will be described. In step S501, the cipher of step S309 is obtained in the encoding/un-encoding program. In step S503, the cipher is formed into a grid, such as the cipher grid illustrated in Table 3-1. The cipher grid is then stored in a computer readable medium 11 (such as a hard drive, CD, DVD, or other type of memory device), which device may also store the operational programs for performing the encoding and/or un-encoding algorithms in accordance with the present invention.

In step S505, the user inputs the encoded text, such as "MSPP2 URM3E VAAVG RKE7L O^EK# A2TMB K %6?G O2222", from Table 5. In step S507, all spaces between encoded text words are deleted. In the example of Table 5, a space has been inserted between every five characters for transmission or ease of viewing purposes. Of course, a space could have been inserted between every four characters or three characters, since such spaces are removed in step S507 and are meaningless to the un-encoding process.

Next, in step S509, the encoded text is validated to ensure that only alphabetic characters, numerals, or special characters (in the complete character set of Table 2) have been entered.

If a character in the encoded text is not in the complete character set of Table 2, an error is determined in step S511 and the process proceeds to step S513. In step S513, the user is alerted as to the presence and reason for the error. As an example, if the error were the presence of the dollar sign $ (not a character in the complete character set of Table 2) in the encoded text, the user could review the encoded text as received in an email and correct any typing error that the user made in entering the encoded text into the encoded text entry box of the program.

If no error is found in step S511, the process proceeds to step S515. In step S515, each encoded character is compared to the cipher grid to determine its relative position. As shown in Table 5, the entire encoded text can be represented by the following grid positions: 19, 12, 26, 26, 7, 3, 1, 19, 20, 5, 28, 11, 11, 28, 16, 1, 13, 5, 9, 25, 2, 6, 5, 13, 18, 11, 7, 4, 19, 10, 13, 41, 37, 40, 16, 2, 7, 7, 7, 7.

Characters of each character pair are then evaluated to determine their positions relative to each other within the cipher grid. The first character pair in the example of Table 5 is located in positions 19 and 12 of the cipher grid, the second character pair is located in positions 26 and 26 of the cipher grid, etc.

There are three possible relative positions of characters in a character pair: (1) The characters in the character pair are in the same column in the cipher grid; (2) The characters in the character pair are in the same row in the cipher grid; and (3) The characters in the character pair are neither in the same column nor in the same row in the cipher grid.

a. Character Pairs in the Same Cipher Grid Column

Step S517 of the un-encoding/substitution algorithm checks to see if the characters in the encoded character pair occur in the same column in the cipher grid. Referring to Table 5 and Table 3-1, the character pair "MS" in the encoded text occurs in the same column. In other words, the positions 19 and 12 in Table 3-2 are in the same column of Table 3-2.

For those character pairs that occur in the same cipher grid column, the algorithm proceeds to step S519. In step S519, the algorithm subtracts one row from the relative cipher grid row. Thus, the cipher grid positions of the character pair are changed from 19 and 12 to 12 and 5.

If the characters in the character pair are not in the same column of the cipher grid, the process proceeds to step S521.

b. Character Pairs in the Same Cipher Grid Row

Step S521 of the un-encoding/substitution algorithm checks to see if the characters in the encoded text character pair occur in the same row the cipher grid. For those character pairs that occur in the same cipher grid row, the process proceeds to step S523. In step S523, the algorithm subtracts one column from the relative cipher grid column. Thus, the cipher grid positions of the character pair "O^" are changed from 2 and 6 to 1 and 5.

If the characters in the character pair are not in the same row of the cipher grid, the process proceeds to step S525.

c. Character Pairs Not in the Same Cipher Grid Column or Row

In step S525, the un-encoding/substitution algorithm determines the relative cipher grid row and column position of each character pair and then in step S527 substitutes the reciprocal diagonal cipher grid positions. Referring to Table 5 and Table 3-1, the characters in the character pair "RM" of the encoded text are in positions 1 and 19 and do not occur in the same column or row of the cipher grid. Reciprocal diagonal substitution changes these positions to 15 and 5, respectively.

Each character pair of the encoded text will undergo one of column, row, and diagonal substitution in steps S519, S523 or S527. Once the grid position substitution has occurred in one of steps S519, S523 or S527, the substituted grid position location is used to pick a new clear text character to represent the encoded text character in step S529. Once all character pairs of the encoded text have been processed, the result is a string of clear text characters. The last line in Table 5 shows the characters resulting from the column, row, and diagonal substitution algorithms discussed above. Next, in step S531, the extra padding (e.g. the plurality of trailing blank spaces) is removed.

As Table 5 indicates, the output is a clear text string which is the same as the original inputted clear text string. Finally, in Step S533, the clear text may be published, which may include such actions as displaying, storing, printing or transmitting the clear text.

E. Display

In accordance with one embodiment of the present invention as illustrated in Table 5, the program of the present invention can also format encoded text output into an easily readable presentation, such as by adding a space between blocks of five encoded characters.

Table 6 shows unformatted encoded output from the example in Table 4, and formatted encoded output.

TABLE 6

| | |
|---|---|
| Unformatted encoded text | MSPP2URM3EVAAVGRKE7LO^EK#A2TMBK%6?GO2222 |
| Formatted encoded text | MSPP2 URM3E VAAVG RKE7L O^EK# A2TMB K%6?G O2222 |

Figure 6:
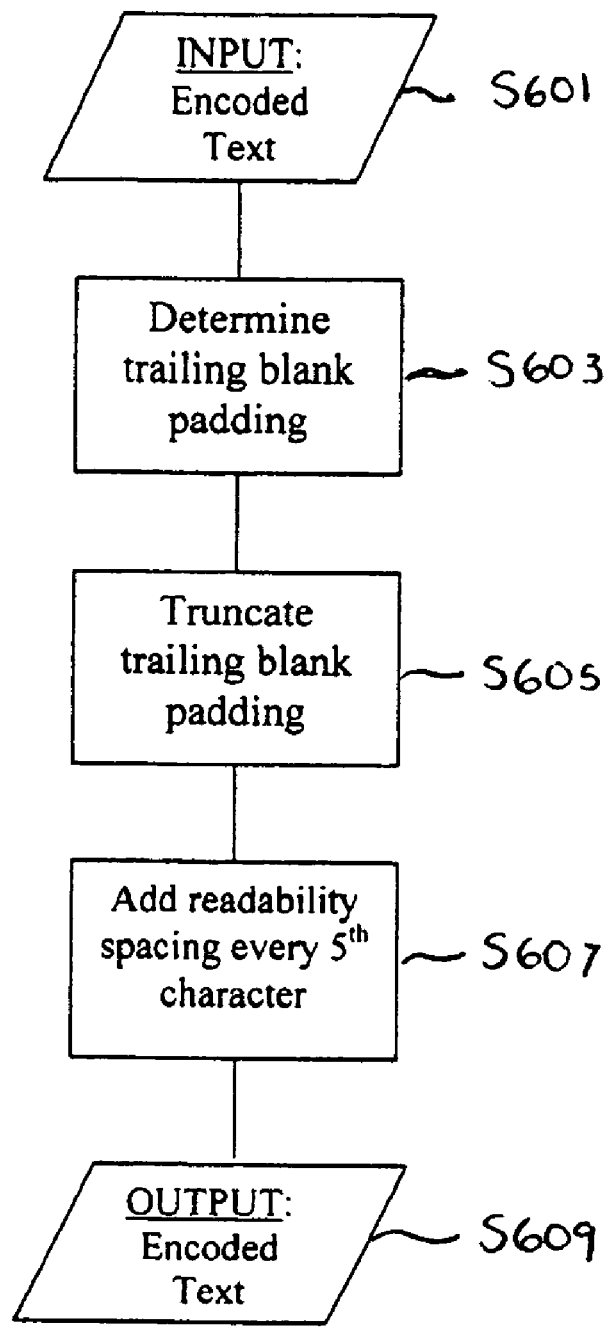
FIG. 6 is a flowchart illustrating how the output is displayed.

Referring to the flow chart of FIG. 6 and Table 6, encoded text is inputted in step S601. In steps S603 and S605, all encoded characters that represent trailing blank spaces (such as the "2222") are optionally determined (step S603) and are optionally truncated (step S605), noting that Table 6 shows that trailing blank spaces may also be optionally retained. A readability space is added every fifth character (in step S607) resulting in blocks of five-character encoded-text output. The formatted encoded-text output is displayed to the user in step S609. As mentioned previously, four character blocks or even six character blocks could be employed, at the discretion of the user.

F. Conclusion

In theory, no substitution cipher system is unbreakable. However, the first embodiment of the cipher of the present invention, as described above, uses twenty-six English alphabetic characters, ten numerals, and six other characters, totaling 42 characters, which provides $1.4 \times 10^{51}$ permutations. Without knowledge of the user-defined key, this number of permutations renders the cipher, to all practical purposes, unbreakable.

The 42-character cipher of the present invention is arranged in a 7-column by 6-row grid. However, it should be understood that the cipher could be arranged into other types of grids. For example, the 42 character cipher could be in the form of a 6-column by 7-row grid. Also, if more special characters were to be included in the total character set, then perhaps a 7-column by 7-row grid could be used enabling 49 total characters, or perhaps an 8-column by 6-row grid to enable 48 total characters, etc.

The cipher grid of the present invention does not distinguish between capital letters and non-capital letters. However, the total character set and hence the cipher grid could be expanded to accommodate both capital and non-capital letters.

As previously mentioned, double characters, such as "ll", in the clear text could be treated as being in the same column and not in same row. Also, double characters could be treated as being in both the same column and the same row, such that one column position would be added to the grid position and one row position would be added to the grid position during encoding. Likewise, one column position would be subtracted from the grid position and one row position would be subtracted from the grid position during un-encoding.

Another enhancement to the present invention concerns special character replacements. It is an optional and additional embodiment, that the program of the present invention would replace difficult special characters such as the open parenthesis "(" with a pound sign "#" and replace the comma character "," with a percentage sign "%". In other words, the total character set would include "#" instead of the "(" and would include "%" instead of ",". Prior to encoding, the occurrences of "(" and "," in the clear text would be replaced with "#" and "%", respectively. After un-encoding, the occurrences of "#" and "%" would be replaced with "(" and ",", respectively.

The reason for the above replacement is that a problem can occur when sending an encoded fax to a recipient. If the recipient scans the fax using OCR software, the "(" will often be picked up as the letter "C" and the comma "," might be picked up as a period "." or simply missed and treated as a space. Therefore, the encoding/substitution algorithm further substitutes the special characters into more easily readable characters as a preemptive measure and corrects for the substitution during the final stage of the un-encoding.

In forming a validated keyword, step S211 was described above as keeping the first occurrence of a character in the input keyword string and deleting any addition occurrence of the same character in the input keyword string. This same ultimate goal could also be accomplished in other ways, such as by looking at the entire input keyword string and keep the last occurrence of the character and removing the earlier occurrences of the character.

In step S307 the validated keyword and missing character set are sequenced to form the cipher, it was previously described that the validated keyword was followed by the remaining characters of the total character set. However, this is not a necessary ordering for the cipher. The cipher could be formed by having the missing characters set followed by the validated keyword.

The word "sequence" as used in the present application to form the cipher does not necessarily mean one after the other. For example, in building the cipher, the sequence is not necessarily the first character of the keyword, followed by the second character of the keyword, . . . followed by the last character of the keyword, followed by the first character of the unused character set, followed by the second character of the unused character set, etc.

A "sequence" in the context of building the cipher could be a more complex pattern. For example, the first character from keyword followed by the first character from the unused character set, followed by the second and third characters from the keyword, followed by the second character from the unused character set, followed by the third, fourth and fifth characters from the keyword, followed by the third character from the unused character set, etc.

The term "sequence" merely means a repeatable pattern of inserting the keyword characters and unused character set characters into the cipher, such that the same repeatable pattern, i.e., sequence, may be used to build the cipher grid at both the encoding and decoding stages.

Also, the term "sequence" as it pertains to placing the cipher string into the cipher grid does not imply any specific order, but merely a repeatable sequence such that the same cipher grid can be formed from the same cipher string at both the encoding and decoding sides of the program. For example, Table 3-1 illustrated that the cipher string was inputted into the cipher grid from left to right beginning with the first row. In an alternative embodiment, the cipher string could be entered into the cipher grid from top to bottom started with the first column followed by the second column from bottom to top, followed by the third column from top to bottom, etc.

Also, the substitution rules on the encoding side detailed in conjunction with steps S419, S423 and S427 need not be exactly as described above. For example, the substitution rule for step S419 could be "add 2 to each character pair row position". The important feature is that the substitution rules on the un-encoding side detailed in steps S519, S523 and S527 are the mirror opposites to the substitution rules employed on the encoding side for steps S419, S423, and S427, respectively.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

I claim:

1. A non-transitory computer-readable medium on which is stored a computer program for encoding data, the computer program comprising instructions which, upon being executed, cause a computing device to perform a process of:
receiving an input keyword string;
removing superfluous characters in the input keyword string which are not in a pre-approved character set to thereby form a truncated keyword string;
removing duplicate characters in the truncated keyword string to form a validated keyword;
comparing the validated keyword to the pre-approved character set and forming a subset of missing characters which are characters appearing in the pre-approved character set and not appearing in the validated keyword;
forming a cipher string by sequencing the characters of the validated keyword with the characters of the subset of missing characters;
forming a cipher grid by forming a matrix having a first number of columns and a second number of rows;
placing one character of the cipher string sequentially into each column and row position;
receiving clear text;
removing any character in the clear text which is not a character in the pre-approved character set;
developing an initial number sequence to represent the characters of the clear text by locating each character in the clear text in the cipher grid and replacing the character with an initial number of the grid position where the character was located, wherein the initial number of each grid position is unique; and
generating an encoded number sequence to represent the characters of the clear text by modifying the initial number sequence, wherein said generating step includes evaluating the initial number sequence in pairs, and modifying a pair using a first modification rule if the pair is located in a same column of the cipher grid, and modifying pairs not in a same column using a different modification rule or rules.

2. The non-transitory computer-readable medium of claim 1, wherein said removing duplicate characters step includes keeping the first occurrence of a character in the truncated keyword string and removing any further occurrence of the same character in the truncated keyword string.

3. The non-transitory computer-readable medium of claim 1, wherein said pre-approved characters set includes a, b, c, d, e, f, g, h, i, j, k, l, m, n, o, p, q, r, s, t, u, v, w, x, y, z, 0, 1, 2, 3, 4, 5, 6, 7, 8, 9 and a fixed set of non-alphabetic and non-numeral special characters.

4. The non-transitory computer-readable medium of claim 1, wherein said forming step forms the cipher string with the validated keyword appearing first followed by the subset of missing characters.

5. The non-transitory computer-readable medium method of claim 1, wherein the number of columns is different than the number of rows.

6. The non-transitory computer-readable medium method of claim 1, wherein the initial number of each grid position is assigned in numerical order starting in the first row and first column of the cipher grid proceeding left to fight and proceeding from up to down to the last row and last column of the cipher grid.

7. The non-transitory computer-readable medium method of claim 1, further comprising instructions which, upon being executed, cause the computing device to perform a process of:
converting the encoded number sequence into encoded text by replacing each number of the encoded number sequence with a character located in the encoded number's position in the cipher grid; and
publishing the encoded text.

8. A non-transitory computer-readable medium on which is stored a computer program for encoding data, the computer program comprising instructions which, upon being executed, cause a computing device to perform a process of:
receiving an input keyword string;
removing superfluous characters in the input keyword string which are not in a pre-approved character set to thereby form a truncated keyword string;
removing duplicate characters in the truncated keyword string to form a validated keyword;
comparing the validated keyword to the pre-approved character set and forming a subset of missing characters which are characters appearing in the pre-approved character set and not appearing in the validated keyword;
forming a cipher string by sequencing the characters of the validated keyword with the characters of the subset of missing characters;
forming a cipher grid by forming a matrix having a first number of columns and a second number of rows;
placing one character of the cipher string sequentially into each column and row position;
receiving clear text;
removing any character in the clear text which is not a character in the pre-approved character set;
developing an initial number sequence to represent the characters of the clear text by locating each character in the clear text in the cipher grid and replacing the character with an initial number of the grid position where the character was located, wherein the initial number of each grid position is unique; and
generating an encoded number sequence to represent the characters of the clear text by modifying the initial number sequence, wherein said generating step includes evaluating the initial number sequence in pairs, and modifying a pair using a first modification rule if the pair is located in a same row of the cipher grid, and modifying pairs not in a same row using a different modification rule or rules.

9. The non-transitory computer-readable medium of claim 8, further comprising instructions which, upon being executed, cause the computing device to perform a process of:
converting the encoded number sequence into encoded text by replacing each number of the encoded number sequence with a character located in the encoded number's position in the cipher grid; and
publishing the encoded text.

10. The non-transitory computer-readable medium of claim 8, wherein said pre-approved characters set includes a, b, c, d, e, f, g, h, i, j, k, l, m, n, o, p, q, r, s, t, u, v, w, x, y, z, 0, 1, 2, 3, 4, 5, 6, 7, 8, 9 and a fixed set of non-alphabetic and non-numeral special characters.

11. The non-transitory computer-readable medium of claim 8, wherein the number of columns is different than the number of rows.

12. A non-transitory computer-readable medium on which is stored a computer program for encoding data, the computer program comprising instructions which, upon being executed, cause a computing device to perform a process of:
receiving an input keyword string;
removing superfluous characters in the input keyword string which are not in a pre-approved character set to thereby form a truncated keyword string;
removing duplicate characters in the truncated keyword string to form a validated keyword;
comparing the validated keyword to the pre-approved character set and forming a subset of missing characters which are characters appearing in the pre-approved character set and not appearing in the validated keyword;
forming a cipher string by sequencing the characters of the validated keyword with the characters of the subset of missing characters;
forming a cipher grid by forming a matrix having a first number of columns and a second number of rows;
placing one character of the cipher string sequentially into each column and row position;
receiving clear text;
removing any character in the clear text which is not a character in the pre-approved character set;
developing an initial number sequence to represent the characters of the clear text by locating each character in the clear text in the cipher grid and replacing the character with an initial number of the grid position where the character was located, wherein the initial number of each grid position is unique; and
generating an encoded number sequence to represent the characters of the clear text by modifying the initial number sequence, wherein said generating step includes evaluating the initial number sequence in pairs, and modifying a pair using a first modification rule if the pair is located in a same column of the cipher grid, and modifying a pair using a second modification rule, different from the first modification rule, if the pair is located in a same row of the cipher grid.

13. The non-transitory computer-readable medium method of claim 12, further comprising instructions which, upon being executed, cause the computing device to perform a process of:
modifying a pair using a third modification rule, different from the first and second modification rules, if the pair is not located in a same column and is not located in same row of the cipher grid.

14. The non-transitory computer-readable medium of claim 13, further comprising instructions which, upon being executed, cause the computing device to perform a process of:
converting the encoded number sequence into encoded text by replacing each number of the encoded number sequence with a character located in the encoded number's position in the cipher grid; and
publishing the encoded text.

15. The non-transitory computer-readable medium of claim 12, further comprising instructions which, upon being executed, cause the computing device to perform a process of:
converting the encoded number sequence into encoded text by replacing each number of the encoded number sequence with a character located in the encoded number's position in the cipher grid; and
publishing the encoded text.

16. The non-transitory computer-readable medium of claim 12, wherein said pre-approved characters set includes a, b, c, d, e, f, g, h, i, j, k, l, m, n, o, p, q, r, s, t, u, v, w, x, y, z, 0, 1, 2, 3, 4, 5, 6, 7, 8, 9 and a fixed set of non-alphabetic and non-numeral special characters.

17. The non-transitory computer-readable medium of claim 12, wherein the number of columns is different than the number of rows.

18. A non-transitory computer-readable medium on which is stored a computer program for un-encoding data, the computer program comprising instructions which, upon being executed, cause a computing device to perform a process of:
receiving an input keyword string;
removing superfluous characters in the input keyword string which are not in a pre-approved character set to thereby form a truncated keyword string;
removing duplicate characters in the truncated keyword string to form a validated keyword;
comparing the validated keyword to the pre-approved character set and forming a subset of missing characters which are characters appearing in the pre-approved character set and not appearing in the validated keyword;
forming a cipher string by sequencing the characters of the validated keyword with the characters of the subset of missing characters;
forming a cipher grid by forming a matrix having a first number of columns and a second number of rows;
placing one character of the cipher string sequentially into each column and row position receiving encoded text;
removing any character in the encoded text which is not a character in the pre-approved character set;
developing an initial number sequence to represent the characters of the encoded text by locating each character in the encoded text in the cipher grid and replacing the character with an initial number of the grid position where the character was located, wherein the initial number of each grid position is unique; and
generating an un-encoded number sequence to represent the characters of the clear text by modifying the initial number sequence, wherein said generating step includes evaluating the initial number sequence in pairs, and modifying a pair using a first modification rule if the pair is located in a same column of the cipher grid, and modifying pairs not in a same column using a different modification rule or rules.

19. The non-transitory computer-readable medium method of claim 18, further comprising instructions which, upon being executed, cause the computing device to perform a process of:

converting the un-encoded number sequence into clear text by replacing each number of the un-encoded number sequence with a character located in the un-encoded number's position in the cipher grid; and publishing the clear text.

20. The non-transitory computer-readable medium of claim 18, wherein said pre-approved characters set includes a, b, c, d, e, f, g, h, i, j, k, l, m, n, o, p, q, r, s, t, u, v, w, x, y, z, 0, 1, 2, 3, 4, 5, 6, 7, 8, 9 and a fixed set of non-alphabetic and non-numeral special characters.

21. The non-transitory computer-readable medium of claim 18, wherein the number of columns is different than the number of rows.

22. A non-transitory computer-readable medium on which is stored a computer program for un-encoding data, the computer program comprising instructions which, upon being executed, cause a computing device to perform a process of:

receiving an input keyword string;

removing superfluous characters in the input keyword string which are not in a pre-approved character set to thereby form a truncated keyword string;

removing duplicate characters in the truncated keyword string to form a validated keyword;

comparing the validated keyword to the pre-approved character set and forming a subset of missing characters which are characters appearing in the pre-approved character set and not appearing in the validated keyword;

forming a cipher string by sequencing the characters of the validated keyword with the characters of the subset of missing characters;

forming a cipher grid by forming a matrix having a first number of columns and a second number of rows;

placing one character of the cipher string sequentially into each column and row position receiving encoded text;

removing any character in the encoded text which is not a character in the pre-approved character set;

developing an initial number sequence to represent the characters of the encoded text by locating each character in the encoded text in the cipher grid and replacing the character with an initial number of the grid position where the character was located, wherein the initial number of each grid position is unique; and generating an un-encoded number sequence to represent the characters of the clear text by modifying the initial number sequence, wherein said generating step includes evaluating the initial number sequence in pairs, and modifying a pair using a first modification rule if the pair is located in a same column of the cipher grid, and modifying a pair using a second modification rule, different from the first modification rule, if the pair is located in a same row of the cipher grid.

23. The non-transitory computer-readable medium of claim 22, further comprising instructions which, upon being executed, cause the computing device to perform a process of:

converting the un-encoded number sequence into clear text by replacing each number of the un-encoded number sequence with a character located in the un-encoded number's position in the cipher grid; and publishing the clear text.

24. The non-transitory computer-readable medium of claim 22, wherein said pre-approved characters set includes a, b, c, d, e, f, g, h, i, j, k, l, m, n, o, p, q, r, s, t, u, v, w, x, y, z, 0, 1, 2, 3, 4, 5, 6, 7, 8, 9 and a fixed set of non-alphabetic and non-numeral special characters.

25. The non-transitory computer-readable medium of claim 22, wherein the number of columns is different than the number of rows.

* * * * *